US011281036B2

(12) United States Patent
You et al.

(10) Patent No.: US 11,281,036 B2
(45) Date of Patent: Mar. 22, 2022

(54) DISPLAY DEVICE

(71) Applicant: Samsung Display Co., LTD., Yongin-si (KR)

(72) Inventors: KwangSun You, Cheonan-si (KR); Hyeonseon Jeong, Asan-si (KR); JunHee Son, Asan-si (KR); JungGil Oh, Hwaseong-si (KR); YoungGyu Jung, Seongnam-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/919,692

(22) Filed: Jul. 2, 2020

(65) Prior Publication Data

US 2021/0055598 A1    Feb. 25, 2021

(30) Foreign Application Priority Data

Aug. 21, 2019  (KR) .......................... 10-2019-0102274

(51) Int. Cl.
  *G02F 1/1333*  (2006.01)
  *F21V 8/00*  (2006.01)
  *G02F 1/1345*  (2006.01)

(52) U.S. Cl.
  CPC ..... *G02F 1/133308* (2013.01); *G02B 6/0083* (2013.01); *G02F 1/13452* (2013.01); *G02F 1/133314* (2021.01); *G02F 1/133317* (2021.01); *G02F 1/133334* (2021.01)

(58) Field of Classification Search
  None
  See application file for complete search history.

(56) References Cited

U.S. PATENT DOCUMENTS

| 8,829,508 | B2 | 9/2014 | Park | |
|---|---|---|---|---|
| 9,690,128 | B2 | 6/2017 | Kang et al. | |
| 10,082,692 | B2 | 9/2018 | You et al. | |
| 2013/0155654 | A1* | 6/2013 | Lin | ................... G02F 1/133308 362/97.1 |
| 2015/0077532 | A1* | 3/2015 | Priest | ................ G02F 1/133308 348/77 |
| 2015/0177548 | A1* | 6/2015 | Jeon | .................. G02F 1/133308 349/12 |
| 2017/0108721 | A1* | 4/2017 | Bae | ....................... H01L 33/486 |
| 2018/0039128 | A1* | 2/2018 | Lee | ...................... G02B 6/0088 |

FOREIGN PATENT DOCUMENTS

| KR | 10-2008-0029184 | 4/2008 |
|---|---|---|
| KR | 10-1255279 | 4/2013 |
| KR | 10-2016-0030018 | 3/2016 |
| KR | 10-2017-0040436 | 4/2017 |
| KR | 10-1955465 | 3/2019 |

* cited by examiner

*Primary Examiner* — Elmito Breval
(74) *Attorney, Agent, or Firm* — Kile Park Reed & Houtteman PLLC (57) ABSTRACT

A display device includes a display panel, a backlight unit disposed under the display panel, an accommodation part that accommodates the backlight unit, a flexible circuit film connected to a side of the display panel, and bent along an outer surface of the accommodation part in an outside of the accommodation part to extend below the accommodation part to form a bending part of the flexible circuit film, a driving chip mounted on the flexible circuit film, and a shield cover disposed in contact with the side of the display panel, and outward from the bending part, the shield cover having a groove defined in a surface facing the bending part.

21 Claims, 6 Drawing Sheets

DISPLAY DEVICE

CROSS-REFERENCE TO RELATED APPLICATION(S)

This application claims priority to and benefits of Korean Patent Application No. 10-2019-0102274 under 35 U.S.C. § 119, filed in the Korean Intellectual Property Office on Aug. 21, 2019, the entire contents of which are incorporated herein by reference.

BACKGROUND

1. Technical Field

The disclosure relates to a display device, and, to a display device capable of preventing a flexible circuit film from being exposed to the outside, and capable of discharging the static electricity generated in a display panel.

2. Description of the Related Art

Among display devices, a liquid crystal display device may include a display panel for displaying an image using light and a backlight unit may be located or disposed in a rear side of the display panel. The backlight unit may provide the light to the display panel. The display panel may include pixels for generating an image. The pixels may adjust the transmittance of the light received from the backlight unit to display the image.

The backlight unit and the display panel may be received in an accommodation unit. The accommodation unit may include a bottom sash and a top sash. The backlight unit may be accommodated in the bottom sash, the display panel may be located or disposed on the backlight unit, and the top sash may be located or disposed on the display panel. The top sash may have a frame shape. The display panel may include a display area and a non-display area around the display area. The display area may be exposed by an opening part defined in the top sash, and the non-display area may not be exposed to the outside by the top sash. In order to extend an exposure area of the display panel, a technology for removing the top sash is currently being developed.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a display device capable of preventing a flexible circuit film from being exposed to the outside, and capable of discharging the static electricity generated in a display panel.

In an embodiment, a display device may include a display panel; a backlight unit disposed under the display panel; an accommodation part that accommodates the backlight unit; a flexible circuit film connected to a side of the display panel, and bent along an outer surface of the accommodation part in an outside of the accommodation part to extend below the accommodation part to form a bending part of the flexible circuit film; a driving chip mounted on the flexible circuit film; and a shield cover disposed in contact with the side of the display panel and outward from the bending part, the shield cover having a groove defined in surface facing the bending part.

In an embodiment, the shield cover may include silicon.

In an embodiment, the display device may further include a conductive layer coated on the shield cover.

In an embodiment, the shield cover may include: a first extension part extending in a second direction, the second direction crossing a first direction that is an extension direction of the side of the display panel, wherein a side of the first extension part is disposed in contact with the side of the display panel; a second extension part extending downward from another side of the first extension part, which is opposite to the side of the first extension part, and facing the bending part; and a third extension part extending in the second direction from a lower end of the second extension part, and overlapping the first extension part in plan view.

In an embodiment, the side of the first extension part may be disposed under the side of the display panel.

In an embodiment, the groove may be defined by the first, second, and third extension parts.

In an embodiment, a part of the bending part may be disposed in the groove.

In an embodiment, the display panel may include: a first substrate; a second substrate disposed under the first substrate; a first polarization plate disposed on the first substrate; and a second polarization plate disposed under the second substrate, wherein the side of the first extension part may be disposed under a side of the first polarization plate to contact the one side of the first polarization plate, and the flexible circuit film may be connected to the first substrate.

In an embodiment, the first polarization plate may extend further than the first substrate to be more adjacent to the first extension part than the first substrate.

In an embodiment, the display device may further include: a mold frame disposed under the second polarization plate to have a frame shape; and an adhesive disposed between the mold frame and the second polarization plate.

In an embodiment, the first and third extension parts may have planes defined by the first and second directions, and extend further in the first direction than in the second direction, and the second extension part may have a plane defined by the first direction and a third direction that vertically crosses the planes, and extends may extend further in the first direction than in the third direction. The third direction may vertically cross the planes defined by the first and second directions.

In an embodiment, the shield cover may further include a fourth extension part and a fifth extension part respectively extending downward from the third extension part, wherein the fourth and fifth extension parts may face each other in the second direction, and, wherein the fourth and fifth extension parts may have planes defined by the first and third directions, and may extend further in the first direction than in the third direction.

In an embodiment, the display device may further include a case disposed under the accommodation part, wherein the case may include: a case bottom part; and case sidewall parts extending upward from an edge of the case bottom part, wherein one of the case sidewall parts may be inserted into a combination groove defined by the third, fourth, and fifth extension parts.

In an embodiment, the accommodation part may include a bottom part and sidewall parts extending upward from an edge of the bottom part to define a space to accommodate the backlight unit, together with the bottom part, and the backlight unit may include a light guide plate disposed in the space and a light source unit adjacent to a side surface of the light guide plate, and disposed in an inner surface of a first sidewall part, the inner surface of the first sidewall part facing the side surface of the light guide plate.

In an embodiment, the first sidewall part may include an outer surface opposite to the inner surface of the first sidewall part, the outer surface of the first sidewall part facing the bending part, and the driving chip may be disposed under the bottom part.

In an embodiment, a display device may include a display panel; a backlight unit disposed under the display panel; an accommodation part that accommodates the backlight unit; a flexible circuit film connected to a side of the display panel, and bent along an outer surface of the accommodation part to extend below the accommodation part to form a bending part of the flexible circuit film; and a shield cover disposed outward from the bending part and facing the bending part, wherein, the shield cover may include a first part disposed in contact with the side of the display panel, and including a shape of an "L" that is rotated about 180 degrees; and a second part disposed in a lower part of the first part and having an arch shape.

In an embodiment, the first part may include a first extension part extending in a second direction, the second direction crossing the first direction that may be an extension direction of the side of the display panel, wherein a side of the first extension part may be disposed in contact with the side of the display panel; and a second extension part extending downward from another side of the first extension part, which is opposite to the side of the first extension part, and facing the bending part, wherein the one side of the first extension part may be disposed under the side of the display panel.

In an embodiment, the display panel may include a first substrate; a second substrate disposed under the first substrate; a first polarization plate disposed on the first substrate; and a second polarization plate disposed under the second substrate, wherein the side of the first extension part may be disposed under a side of the first polarization plate to contact the one side of the first polarization plate, and the flexible circuit film may be connected to the first substrate.

In an embodiment, the second part may include a third extension part extending in the second direction from a lower end of the second extension part, and overlapping the first extension part in plan view; and a fourth extension part and a fifth extension part to respectively extend downward from the third extension part, which are opposite to each other in the second direction, and face each other, wherein a part of the bending part may be disposed in a groove defined by the first, second, and third extension parts.

In an embodiment, the display device may include a case disposed under the accommodation part, wherein the case may comprise a case bottom part; and case sidewall parts extending upward from an edge of the case bottom part, wherein one of the case sidewall parts may be inserted into a combination groove between the fourth, and fifth extension parts.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain principles of the disclosure. In the drawings.

DETAILED DESCRIPTION OF THE EMBODIMENTS

The disclosure will now be described more fully hereinafter with reference to the accompanying drawings, in which embodiments of the disclosure are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

Some of the parts which are not associated with the description may not be provided in order to describe embodiments of the disclosure and like reference numerals refer to like elements throughout the specification.

When a layer, film, region, substrate, or area, is referred to as being "on" another layer, film, region, substrate, or area, it may be directly on the other film, region, substrate, or area, or intervening films, regions, substrates, or areas, may be present therebetween. Conversely, when a layer, film, region, substrate, or area, is referred to as being "directly on" another layer, film, region, substrate, or area, intervening layers, films, regions, substrates, or areas, may be absent therebetween. Further when a layer, film, region, substrate, or area, is referred to as being "below" another layer, film, region, substrate, or area, it may be directly below the other layer, film, region, substrate, or area, or intervening layers, films, regions, substrates, or areas, may be present therebetween. Conversely, when a layer, film, region, substrate, or area, is referred to as being "directly below" another layer, film, region, substrate, or area, intervening layers, films, regions, substrates, or areas, may be absent therebetween. Further, "over" or "on" may include positioning on or below an object and does not necessarily imply a direction based upon gravity.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

Throughout the specification, when an element is referred to as being "connected" to another element, the element may be "directly connected" to another element, or "electrically connected" to another element with one or more intervening elements interposed therebetween. It will be further understood that when the terms "comprises," "comprising," "includes" and/or "including" are used in this specification, they or it may specify the presence of stated features, integers, steps, operations, elements and/or components, but do not preclude the presence or addition of other features, integers, steps, operations, elements, components, and/or any combination thereof.

In the drawings, sizes and thicknesses of elements may be enlarged for better understanding, clarity, and ease of description thereof. However, the disclosure is not limited to the illustrated sizes and thicknesses. In the drawings, the thicknesses of layers, films, panels, regions, and other elements, may be exaggerated for clarity. In the drawings, for better understanding and ease of description, the thicknesses of some layers and areas may be exaggerated.

Further, in the specification, the phrase "in a plan view" means when an object portion is viewed from above, and the phrase "in a schematic cross-sectional view" means when a schematic cross-section taken by vertically cutting an object portion is viewed from the side.

Additionally, the terms "overlap" or "overlapped" mean that a first object may be above or below or to a side of a second object, and vice versa. Additionally, the term "overlap" may include layer, stack, face or facing, extending over, covering or partly covering or any other suitable term as would be appreciated and understood by those of ordinary skill in the art. The terms "face" and "facing" mean that a first element may directly or indirectly oppose a second element. In a case in which a third element intervenes between the first and second element, the first and second element may be understood as being indirectly opposed to one another, although still facing each other. When an element is described as 'not overlapping' or 'to not overlap' another element, this may include that the elements are spaced apart from each other, offset from each other, or set aside from each other or any other suitable term as would be appreciated and understood by those of ordinary skill in the art.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 5% of the stated value. In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B."

Terms such as first, second, and the like may be used to describe various components, but these components should not be limited by the terms. These terms are generally only used to distinguish one element from another. For instance, a first component may be referred to as a second component, or similarly, a second component may be referred to as a first component, without departing from the spirit and scope of the disclosure. As used herein, the singular forms "a," "an," and "the" may be intended to include the plural forms as well, unless the context clearly indicates otherwise.

Unless otherwise defined, all terms (including technical and scientific terms) used herein have the same meaning as commonly understood by one of ordinary skill in the art to which embodiments pertain. In addition, it will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, embodiments will be described in detail with reference to the accompanying drawings.

Figure 1:
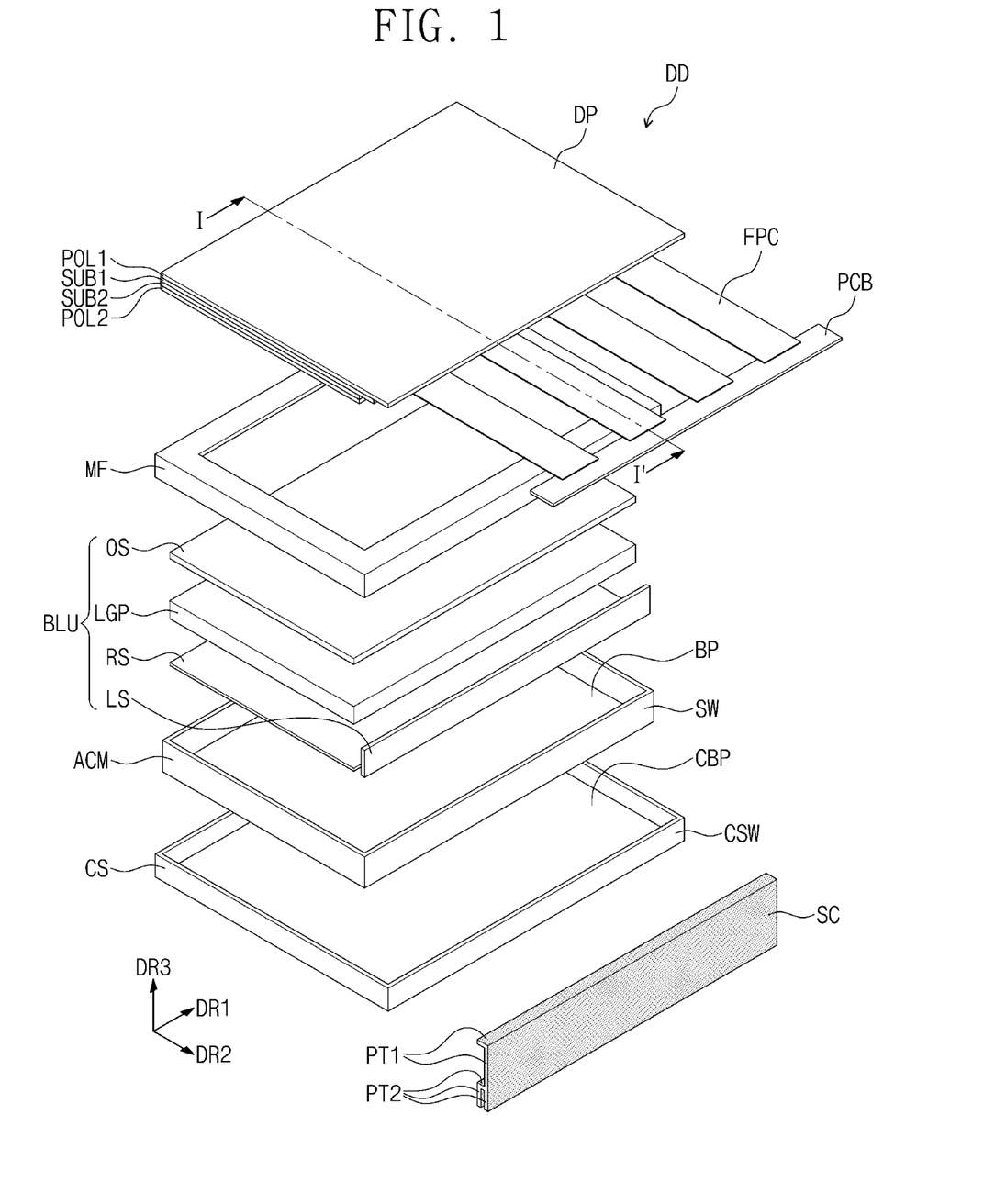
FIG. 1 is an exploded perspective view of a display device according to an embodiment.
Figure 2:
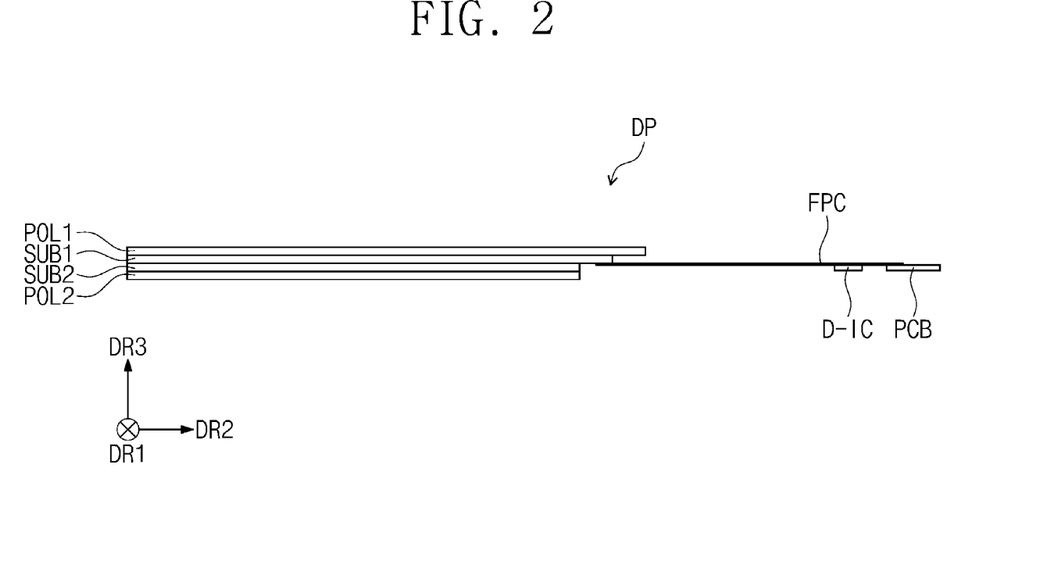
FIG. 2 is a side view of a display panel illustrated in FIG. 1 when the display panel is viewed in a first direction.
Figure 3:
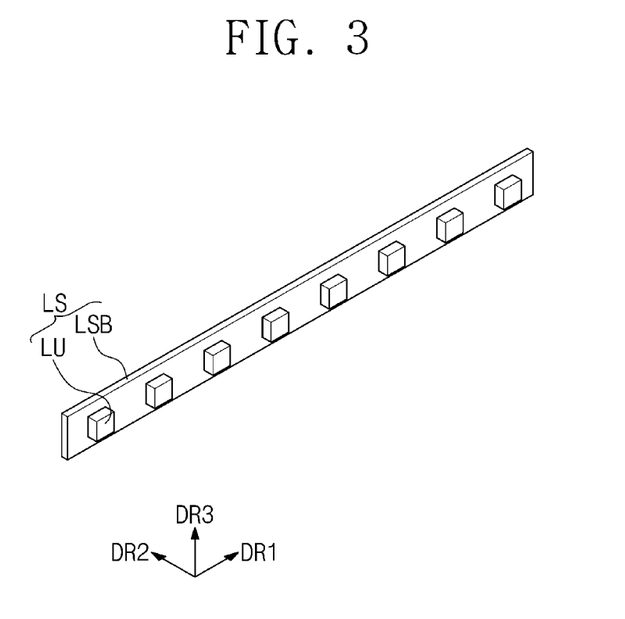
FIG. 3 illustrates light source units of a light source illustrated in FIG. 1.

FIG. 1 is an exploded perspective view of a display device according to an embodiment. FIG. 2 is a side view of a display panel illustrated in FIG. 1 when the display panel is viewed in a first direction. FIG. 3 illustrates light source units of a light source illustrated in FIG. 1.

Referring to FIG. 1, a display device DD according to an embodiment may include a display panel DP, flexible circuit films FPC, a printed circuit board PCB, a backlight unit BLU, an accommodation part ACM, a mold frame MF, a case CS, and a shield cover SC.

The display panel DP may have a rectangular shape of long sides extending in a first direction DR1 and short sides extending in a second direction DR2. The second direction DR2 may cross or intersect the first direction DR1. The shape of the display panel DP is not limited to that of a rectangular shape and other shapes of the display panel DP may be included within the spirit and scope of the disclosure. The display panel DP may have a plane defined by the first and second directions DR1 and DR2. Hereinafter, a direction, which may substantially vertically cross the plane defined by the first and second directions DR1 and DR2, may be defined as a third direction DR3.

The backlight unit BLU may be located or disposed under the display panel DP. The backlight unit BLU may generate light to provide the light to the display panel DP. The display panel DP may use the light provided from the backlight unit BLU to display an image or images.

The display panel DP may include a first substrate SUB1, a second substrate SUB2, a first polarization plate POL1 and a second polarization plate POL2. The first substrate SUB1, the second substrate SUB2, the first polarization plate POL1, and the second polarization plate POL2 may have rectangular shapes with the long sides in the first direction DR1 and the short sides in the second direction DR2. However, the disclosure is not limited thereto and the first substrate SUB1, the second substrate SUB2, the first polarization plate POL1, and the second polarization plate POL2 may have rectangular shapes with the short sides in the first direction DR1 and the long sides in the second direction DR2

The first and second substrates SUB1 and SUB2 may be transparent insulation substrates, and may include plastics or glass. The second substrate SUB2 may be located or disposed under the first substrate SUB1. The first polarization plate POL1 may be located or disposed on the first substrate SUB1. The second polarization plate POL2 may be located or disposed under the second substrate SUB2.

The display panel DP may be a liquid crystal display panel. For example, although not shown in FIG. 1, the display panel DP may include a liquid crystal layer located or disposed between the first substrate SUB1 and the second substrate SUB2. However, the display panel DP is not limited thereto, and may be an electrowetting display panel including an electrowetting layer, an electrophoretic display panel including an electrophoretic layer, or an organic light emitting display panel including organic light emitting elements. When the display panel DP is the organic light emitting display panel, the backlight unit BLU may be omitted.

Although not shown, the first substrate SUB1 may include transistors and pixel electrodes for driving the liquid crystal layer. The second substrate SUB2 may include a common electrode and color filters. The transistors, the pixel electrodes, the common electrode, and the color filters will be described in detail below with reference to FIG. 5.

The flexible circuit films FPC may extend in the second direction DR2, and may be arrayed in the first direction DR1. The flexible circuit films FPC may be connected to the display panel DP and the printed circuit board PCB. For example, among both sides of the flexible circuit films FPC, which may be opposite to each other in the second direction DR2, one of the sides of the flexible circuit films FPC may be connected to the display panel DP. The another of the sides of the flexible circuit films FPC among the both sides may be connected to the printed circuit board PCB.

The flexible circuit films FPC may be connected to one side of the display panel DP. One side of the display panel DP may be defined as any one among the long sides of the display panel DP, and extend in the first direction DR1.

Referring to FIGS. 1 and 2, with reference to the second direction DR2, the first substrate SUB1 may extend longer or further than the second substrate SUB2, and the first polarization plate POL1 may extend longer or further than the first substrate SUB1. The second polarization plate POL2 may have the same length as the second substrate SUB2.

In FIG. 2, the right sides of the first substrate SUB1, the second substrate SUB2, the first polarization plate POL1, and the second polarization plate POL2 may be respectively defined as the one sides of the first substrate SUB1, the second substrate SUB2, the first polarization plate POL1, and the second polarization plate POL2. In FIG. 2, the left sides of the first substrate SUB1, the second substrate SUB2, the first polarization plate POL1, and the second polarization plate POL2 may be respectively defined as the other sides of the first substrate SUB1, the second substrate SUB2, the first polarization plate POL1 and the second polarization plate POL2.

The one side of the first substrate SUB1 may be located or disposed to extend or protrude further than the one side of the second substrate SUB2. The one side of the first polarization plate POL1 may be located or disposed to extend or protrude further than the one side of the first substrate SUB1 or the second polarization plate POL2. The other sides of the first substrate SUB1, the second substrate SUB2, the first polarization plate POL1 and the second polarization plate POL2 may overlap each other.

The flexible circuit films FPC may be connected to the lower part of the one side of the display panel SUB1. A driving chip D-IC may be located or disposed in the lower part of the flexible circuit film FPC. Operations of the driving chip D-IC, the printed circuit board PCB, and the display panel will be described in detail below with reference to FIG. 4.

With reference to FIG. 1, the backlight unit BLU may be an edge-type backlight unit. The backlight unit BLU may include a light guide plate, a light source LS, an optical sheet OS, and a reflection sheet RS. The light guide plate LGP, the optical sheet OS, and the reflection sheet RS may have rectangular shapes having long sides extending in the first direction DR1 and short sides extending in the second direction DR2 but the disclosure is not limited thereto.

The light source LS may extend in the first direction DR1. The light source LS may be located or disposed to be adjacent to one among both side surfaces of the light guide plate LGP, which may be opposite to each other in the second direction DR2. The light source LS may generate light to be used for the display panel DP. The light generated by the light source LS may be provided to the one side surface of the light guide plate LGP.

The one side surface of the light guide plate LGP may be defined by any one among the long sides of the light guide plate LGP. The one side surface of the light guide plate LGP may be defined as a light input unit, and the opposite side surface of the one side surface of the light guide plate LGP may be defined as a light output unit. The light guide plate LPG may include transparent plastics or glass.

Referring to FIGS. 1 and 3, the light source LS may include a light source substrate LSB extending in the first direction DR1, and light source units LU located or disposed on the light source substrate LSB. The light source units LU may be arrayed in the first direction DR1. The light source units LU may be located or disposed to face one side surface of the light guide plate LGP.

The light source units LU may generate light to provide the light to the light guide plate LGP. The light guide plate LGP may guide the traveling direction of the light provided from the light source LS to an upper direction (or the third direction DR3) in which the display panel DP may be located or disposed.

Referring to FIG. 1, the reflection sheet RS may be located or disposed under the light guide plate LGP, and the optical sheet OS may be located or disposed on the light guide plate LGP. The display panel DP may be located or disposed on the optical sheet OS.

The reflection sheet RS may reflect the light emitted below the light guide plate LGP, to an upper direction. The optical sheet OS may spread or concentrate light provided from the light guide plate LGP. The optical sheet OS may include a spread sheet (not shown) and a prism sheet (not shown) located or disposed on the spread sheet.

The spread sheet may spread light provided from the light guide plate LGP. The prism sheet may concentrate the light spread by the spread sheet into an upper direction (or the third direction DR3). The light passing through the prism sheet may travel to the upper direction to be provided to the display panel DP with a uniform brightness distribution.

The light provided to the display panel DP may be polarized by the second polarization plate POL2, transmitted through the second substrate SUB2, and then provided to the liquid crystal layer. The liquid crystal layer driven by the transistors, the pixel electrodes, and the common electrode of the first and second substrates SUB1 and SUB2 may adjust the transmittance of the light. The light may be transmitted through the first substrate SUB1 and the first polarization plate POL1 to be provided to an external user. For example, a polarization axis of the first polarization plate POL1 and a polarization axis of the second polarization plate POL2 may cross or intersect each other.

The accommodation part ACM may accommodate the backlight unit BLU. The accommodation part ACM may be defined as a bottom sash. The accommodation part ACM may include a bottom part BP having a rectangular shape and a sidewall part SW extending from an edge of the bottom part BP to the upper part (or the third direction DR3). The backlight unit BLU may be located or disposed in an accommodation space defined by the bottom part BP and the sidewall part SW. The configuration in which the backlight unit BLU may be located or disposed in the accommodation part ACM will be described in detail below with reference to FIG. 8.

The case CS may be located or disposed under the accommodation part ACM. The case CS may include a case bottom part CBP having a rectangular shape and a case sidewall part CSW extending from an edge of the case bottom part CBP to the upper part (or the third direction DR3).

The mold frame MF may have a rectangular frame shape. The mold frame MF may be located or disposed between the display panel DP and the backlight unit BLU. The mold frame MF may support the backlight unit BLU under the display panel DP. The detailed disposition positions of the mold frame MF and the display panel DP will be described in detail below with reference to FIG. 8.

The display panel DP may be located or disposed at an uppermost part of the display device DD. For example, a structure such as a top sash having a frame shape may not be located or disposed on the display panel DP. Accordingly, an exposure area of the display panel DP may be enlarged.

The shield cover SC may extend in the first direction DR1. FIG. 1 illustrates a perspective view of the shield cover SC to show the rear surface of the shield cover SC. A perspective view of the shield cover SC showing the front surface of the shield cover SC is illustrated and described below with reference to FIG. 6.

The shield cover SC may be adjacent to one of the sides of the accommodation part ACM and the case CS. The shield cover SC may be adjacent to the flexible circuit films FPC. The shield cover SC may contact one side of the display panel DP, be coupled to the case CS, and be located or disposed to extend or protrude more outwards than the flexible circuit films FPC. Such a configuration will be described in detail below with reference to FIG. 8.

When viewed in the first direction DR1, the shield cover SC may include a first part PT1 that includes a rotated letter "L" "¬", for example, a shape obtained by rotating "L" in a clockwise direction by about 180 degrees The shield cover SC may have a second part PT2 having a shape that includes a rotated letter "U", such as a "⊏" in a clockwise direction by 90 degrees. For example, the shape may also be a shape obtained by rotating "U" in a clockwise direction by about 180 degrees. In other words, the shapes may be shaped like corners of a four-sided figure such as a square or a rectangle. The second part PT2 may have a shape of an arch or a horseshoe. The second part PT2 may be located or disposed below the second part PT1. A detailed structure of the shield cover SC will be described in detail below with reference to FIGS. 6 and 7.

Figure 4:
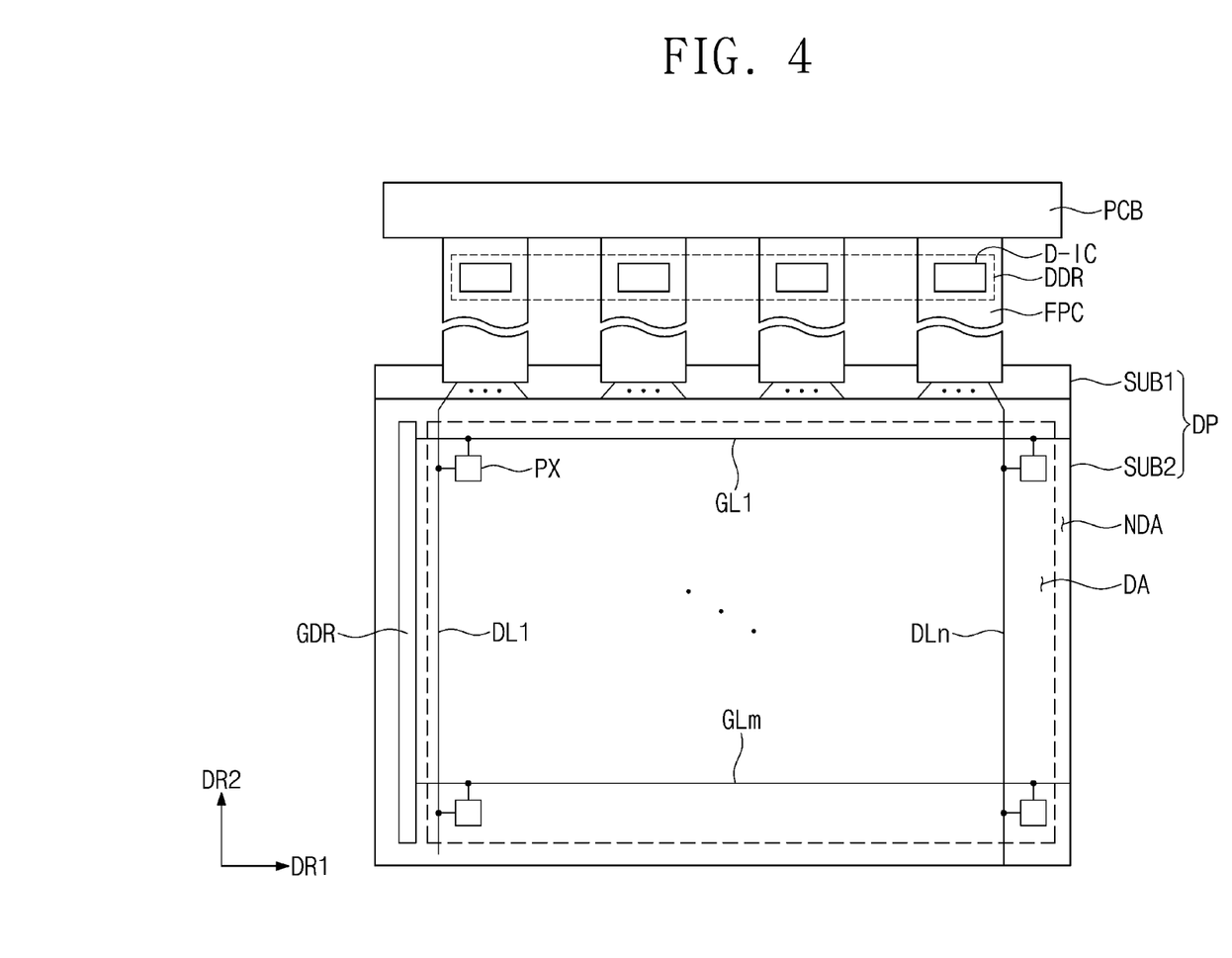
FIG. 4 shows a planar configuration of the display panel illustrated in FIG. 1.
Figure 5:
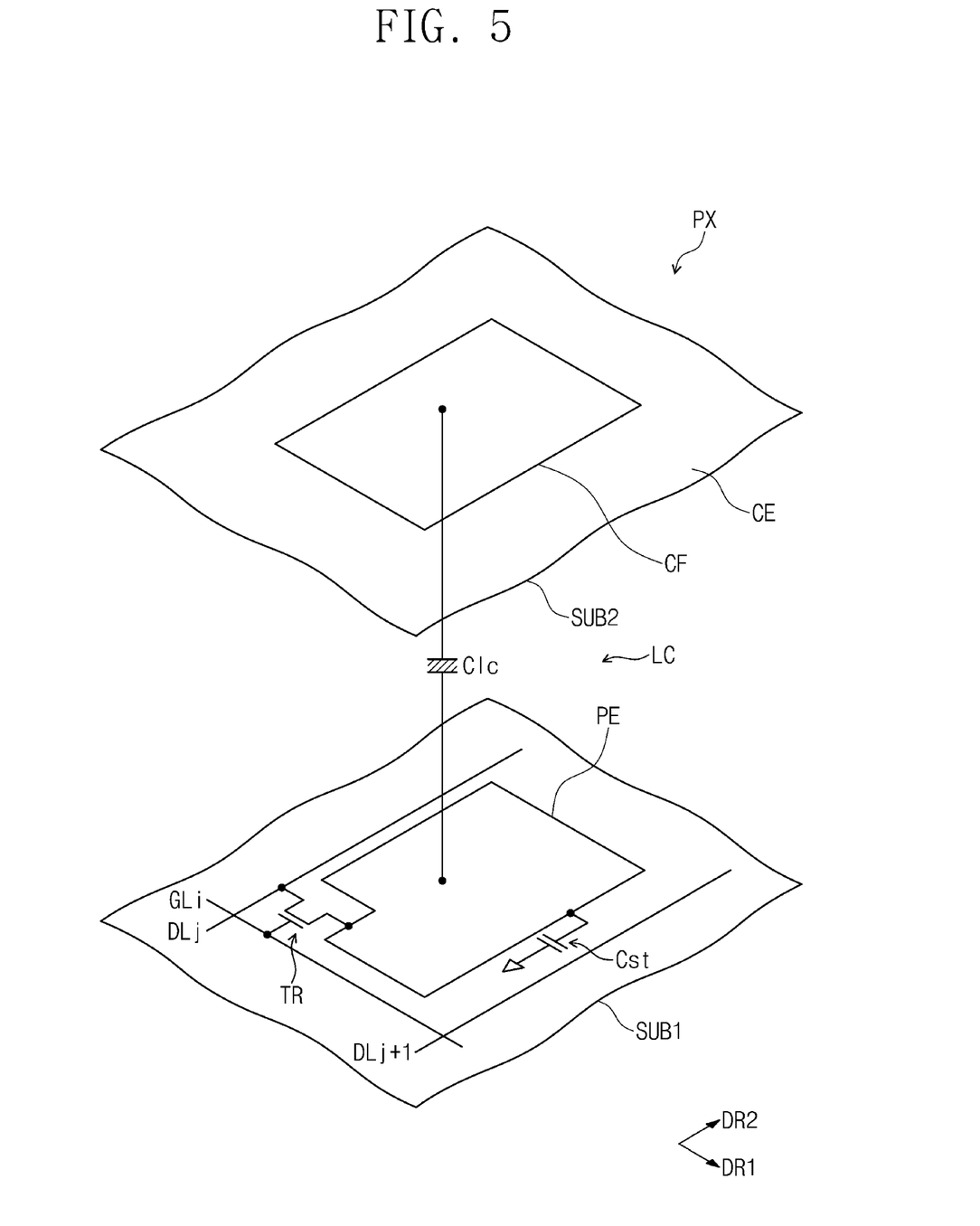
FIG. 5 shows a configuration of any one pixel among pixels illustrated in FIG. 4.

FIG. 4 shows a planar configuration of the display panel illustrated in FIG. 1. FIG. 5 shows the configuration of any one pixel among pixels illustrated in FIG. 4.

For convenience of explanation, the first and second polarization plates POL1 and POL2 are omitted in FIGS. 4 and 5. In FIGS. 4 and 5, the first substrate SUB1 may be located or disposed under the second substrate SUB2.

For convenience of explanation, a pixel PX connected to a gate line GLi and a data line DLj is illustrated in FIG. 5. Although not illustrated in the drawing, configurations of other pixels PX of the display panel DP may be substantially the same as that of the pixel PX illustrated in FIG. 5.

With reference to FIG. 4, the display device DD may include a display panel DP, a gate driving unit GDR, a printed circuit board PCB, and a data driving unit DDR. The display panel DP may be divided into a display area DA on which an image may be displayed and a non-display area NDA around the display area DA. The non-display area NDA may be located or disposed to surround the display area DA.

The display panel DP may include pixels PX, gate lines GL1 to GLm, and data lines DL1 to DLn. Here, m and n are natural numbers. The pixels PX may be arrayed in a matrix type and located or disposed in the display area DA. However, the array type of the pixels is not limited thereto.

Each pixel PX may display one among the primary colors. The primary colors may include red, green, and blue. However, the primary colors are not limited thereto and may include various colors such as white, yellow, cyan, and magenta.

The gate lines GL1 to GLm and the data lines DL1 to DLn may be insulated from and intersect or cross with each other. The gate lines GL1 to GLm may extend in the first direction DR1 to be connected to the gate driver GDR. The data lines DL1 to DLn may extend in the second direction DR2 to be connected to the data driver DDR. The pixels PX may be connected to gate lines GL1 to GLm and data lines DL1 to DLn.

The gate driving unit GDR may be located or disposed in the non-display area NDA adjacent to any one among the short sides of the first substrate SUB1. The gate driving units GDR may be substantially simultaneously formed in the same process as those of transistors of the pixels PX and mounted on the first substrate SUB1 in an Amorphous Silicon TFT Gate driver circuit (ASG) type or an Oxide Silicon TFT Gate driver circuit (OSG) type.

However, the disclosure is not limited thereto, and the gate driving unit GDR may be formed of driving chips, mounted on flexible printed circuit boards, and then connected to the first substrate SUB1 in a Tape Carrier Package (TCP) scheme. As an alternative, the driving chips of the gate driving unit GDR may be mounted on the first substrate SUB1 in a chip on glass (COG) scheme.

The data driving unit DDR may include driving chips D-IC mounted on the flexible circuit films FPC. For example, four driving chips D-IC and four flexible circuit films FPC are illustrated, but, according to the size of the display panel DP, the numbers of the driving chips D-IC and the flexible circuit films FPC are not limited thereto.

The flexible circuit films FPC may be connected to the printed circuit board PCB and one side of the first substrate SUB1, which may be defined as any one among the long sides of the first substrate SUB1. The driving chips D-IC may be connected to the first substrate SUB1 and the printed circuit board PCB through the flexible circuit films FPC. However, the disclosure is not limited thereto, and the driving chips D-IC may be mounted on the first substrate SUB1 in a chip on glass scheme.

A timing controller (not shown) may be located or disposed on the printed circuit board PCB. The timing controller may be mounted on the printed circuit board PCB in a type of an integrated circuit chip. The timing controller may be connected to the gate driving unit GDR and the data driving unit DDR through the flexible circuit films FPC. The timing controller may output a gate control signal, a data control signal, and image signals.

The gate driving unit GDR may receive a gate control signal from the timing controller, and may generate gate signals in response to the gate control signal. The gate driving unit GDR may sequentially output the gate signals. The gate signals may be provided to the pixels PX through the gate lines GL1 to GLm.

The data driving unit DDR may receive the image signals and a data control signal from the timing controller. The data driving unit DDR may generate analog data voltages corresponding to the image signals in response to the data control signal to output the data voltages. The data voltages may be provided to the pixels PX through the data lines DL1 to DLn.

The pixels PX may receive the data voltages through the data lines DL1 to DLn in response to the gate signals received through the gate lines GL1 to GLm. An image or images may be displayed by the pixels PX displaying gradation corresponding to the data voltages.

Referring to FIG. 5, the pixel PX may include a transistor TR connected to the gate line GLi and the data line DLj, a liquid crystal capacitor Clc connected to the transistor TR, and a storage capacitor Cst connected to the liquid crystal capacitor Clc in parallel. The storage capacitor Cst may be omitted. Here, i and j are natural numbers.

The transistor TR may be located or disposed on the first substrate SUB1. The transistor TR may include a gate electrode (not shown) connected to the gate line GLi, a source electrode (not shown) connected to the data line DLj, and a drain electrode (not shown) connected to the liquid crystal capacitor Clc and the storage capacitor Cst.

The liquid crystal capacitor Clc may include a pixel electrode PE located or disposed on the first substrate SUB1, a common electrode CE located or disposed on the second substrate SUB2, and the liquid crystal layer LC located or disposed between the pixel electrode PE and the common electrode CE. The liquid crystal layer LC may operate as a dielectric. The pixel electrode PE may be connected to the drain electrode of the transistor TR.

In FIG. 5, the pixel electrode PE may have a non-slit or continuous structure, but is not limited hereto. The pixel electrode PE may have a slit structure including a stem part of a cross shape and branch parts extending from the stem part in a radial form.

The common electrode CE may be located or disposed on the second substrate SUB2. However, the disclosure is not limited thereto, and the common electrode CE may be located or disposed on the first substrate SUB1. In this case, at least one of the pixel electrode PE and the common electrode CE may include a slit.

The storage capacitor Cst may include the pixel electrode PE, a storage electrode (not shown) branched or extending from a storage line (not shown), and an insulation layer located or disposed between the pixel electrode PE and the storage electrode. The storage line may be located or disposed on the first substrate SUB1 and substantially simultaneously formed on the same layer as the gate line GLi. The storage electrode may partially overlap the pixel electrode PE.

The pixel PX may include a color filter CF representing one of red, green, and blue colors. In an embodiment, the color filter CF may be located or disposed on the second substrate SUB2, as illustrated in FIG. 5. However, the disclosure is not limited thereto, and the color filter CF may be located or disposed on the first substrate SUB1.

The transistor TR may be turned on in response to a gate signal provided through the gate line GLi. A data voltage received through the data line DLj may be provided to the pixel electrode PE of the liquid crystal capacitor Clc through the turned-on transistor TR. A common voltage may be applied to the common electrode CE.

An electric field may be formed between the pixel electrode PE and the common electrode CE due to a level difference between the data voltage and the common voltage. Liquid crystal molecules of the liquid crystal layer LC may be driven by the electric field formed between the pixel electrode PE and the common electrode CE. The light transmittance may be adjusted by the liquid crystal molecules driven by the electric field, and thus the image or images may be displayed.

A storage voltage having a constant voltage level may be applied to the storage line. However, the disclosure is not limited hereto, and the storage line may receive the common voltage. The storage capacitor Cst may supplement a charge amount of the liquid crystal capacitor Clc.

Figure 6:
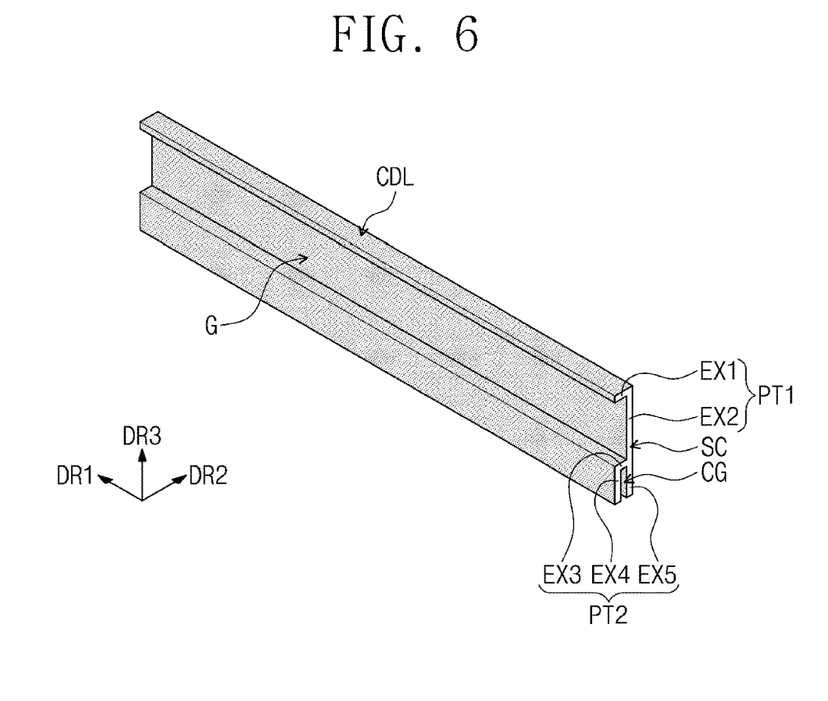
FIG. 6 is a perspective view of a shield cover illustrated in FIG. 1, in which a front surface of the shield cover is viewed.
Figure 7:
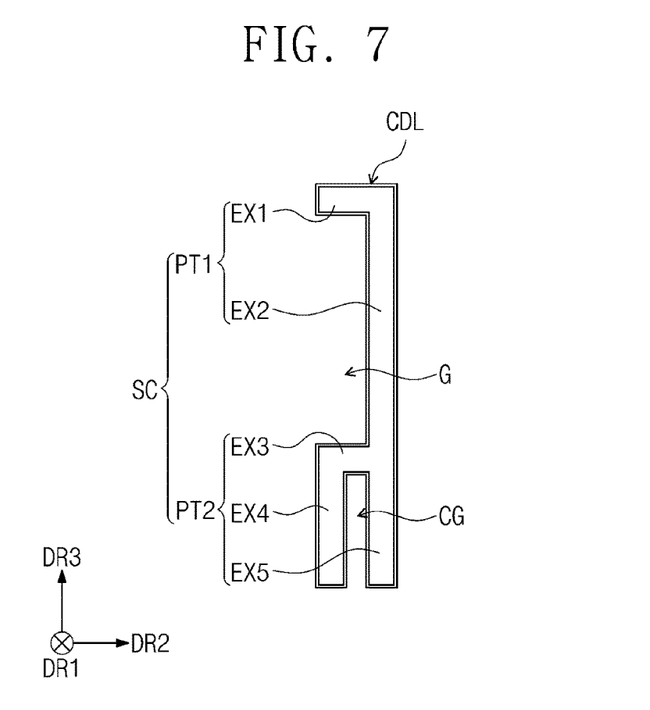
FIG. 7 is a side view of the shield cover illustrated in FIG. 6 when the shield cover is viewed in the first direction.

FIG. 6 is a perspective view of the shield cover illustrated in FIG. 1, in which the front surface of the shield cover is viewed. FIG. 7 is a side view of the shield cover illustrated in FIG. 6 when the shield cover is viewed in the first direction.

For convenience of explanation, the shield cover SC in FIG. 7 is enlarged.

With reference to FIG. 6, the shield cover SC may include the first part PT1 and the second part PT2. The first part PT1 may include a first extension part EX1 and a second extension part EX2, and the second part PT2 may include a third extension part EX3, a fourth extension part EX4, and a fifth extension part EX5.

The first extension part EX1 may have a plane defined by the first and second directions DR1 and DR2. The first extension part EX1 may extend longer or further in the first direction DR1 than in the second direction DR2.

The second extension part EX2 may extend downward from the first extension part EX1. The second extension part EX2 may have a plane defined by the first and third directions DR1 and DR3. The second extension part EX2 may extend longer or further in the first direction DR1 than in the third direction DR3.

The third extension part EX3 may extend from the lower end of the second extension part EX2. The third extension part EX3 may have a plane defined by the first and second directions DR1 and DR2. When viewed on a plane, the third extension part EX3 may overlap the first extension part EX1. The meaning of "when viewed on a plane" may mean a state viewed in the third direction DR3. The third extension part EX3 may extend longer or further in the first direction DR1 than in the second direction DR2.

A groove G may be defined in one surface of the shield cover SC. The groove G may be defined by the first extension part EX1, the second extension part EX2, and the third extension part EX3. The role of the groove G will be described in detail below with reference to FIG. 8.

The fourth extension part EX4 and the fifth extension part EX5 may be separated from each other in the second direction DR2, and extend downward from the third extension part EX3. The fourth extension part EX4 and the fifth extension part EX5 may face each other in the second direction DR2.

The fourth extension part EX4 and the fifth extension part EX5 may have planes defined by the first and third directions DR1 and DR3. The fourth extension part EX4 and the fifth extension part EX5 may extend longer or further in the first direction DR1 than in the third direction DR3. A combination groove CG may be located or disposed between the fourth extension part EX4 and the fifth extension part EX5. The combination groove CG may be defined by the third extension part EX3, the fourth extension part EX4, and the fifth extension part EX5. In a side view, and as illustrated in FIG. 7, the combination of the first part PT1 and the second part PT2, the first extension part EX1, the second extension part EX2, the third extension part EX3, the fourth extension part EX4, and the fifth extension part EX5, the groove G and the combination groove CG, may form the shape of a chair or a bench.

The shield cover SC may include silicon. A conductive layer CDL having electrical conductivity may be coated on the surface of the shield cover SC.

With reference to FIG. 7, when viewed in the first direction DR1, the first extension part EX1 may extend in the second direction DR2. One side of the first extension part EX1 (for example, the left side of the first extension part EX1 in FIG. 7) among both sides of the first extension part EX1, which may be opposite to each other in the second direction DR2, may contact (shown in FIG. 8) one side of the display panel DP. When viewed in the first direction DR1, the second extension part EX2 may extend downward from the other side of the first extension part EX1 (for example, the right side of the first extension part EX1), which may be opposite to the one side of the first extension part EX1.

When viewed in the first direction DR1, the third extension part EX3 may extend in the second direction DR2 from the lower end of the second extension part EX2 and may overlap the first extension part EX1. When viewed in the first direction DR1, the fourth extension part EX4 and the fifth extension part EX5 may respectively extend downward from both sides of the third extension part EX3, which may be opposite to each other.

The first part PT1, which may have the shape of "¬" (the shape obtained by rotating "L" in a clockwise direction by about 180 degrees), may be defined by the first extension part EX1 and the second extension part EX2. The second part PT2, which may have the shape of "⊐" (the shape obtained by rotating "U" in a clockwise direction by about 180 degrees or may be a horseshoe or an arch shape), may be defined by the third extension part EX3, the fourth extension part EX4 and the fifth extension part EX5.

Figure 8:
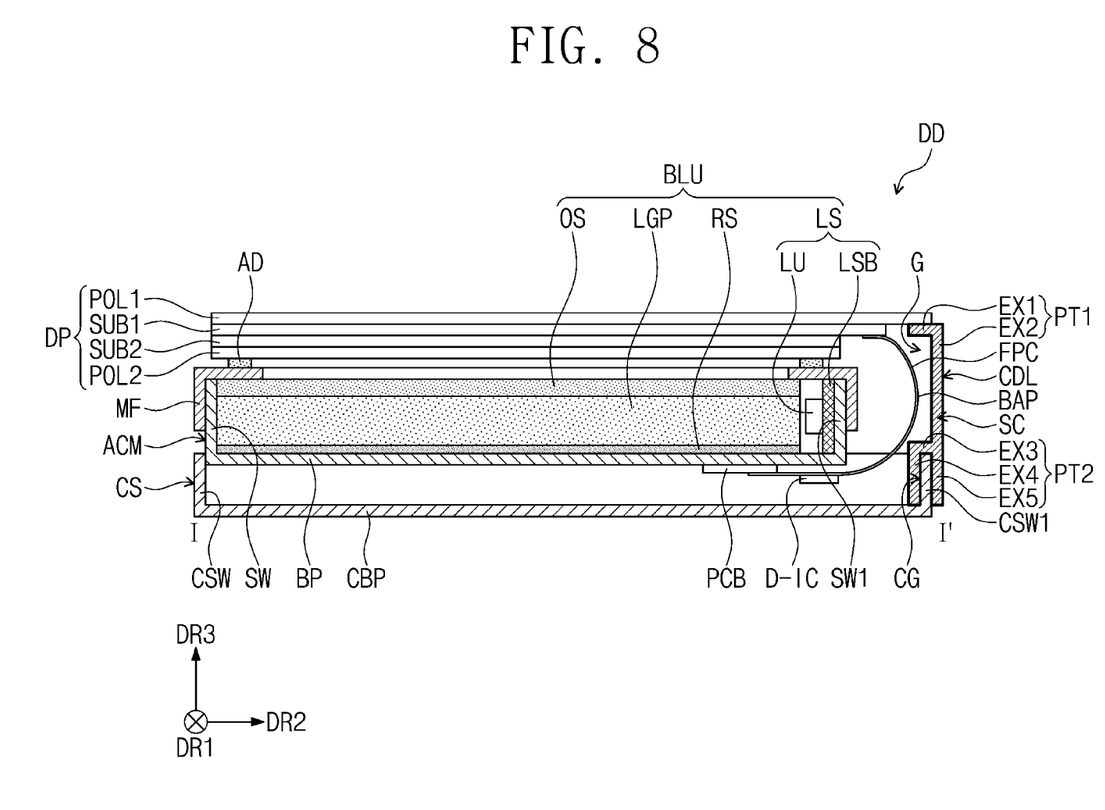
FIG. 8 is a schematic cross-sectional view from line I-I' illustrated in FIG. 1.

FIG. 8 is a schematic cross-sectional view from line I-I' shown in FIG. 1.

With reference to FIG. 8, the backlight unit BLU may be received in the accommodation part ACM. The backlight unit BLU may be located or disposed in an accommodation space defined by the bottom part BP and the sidewall part SW of the accommodation part ACM. The reflection sheet RS, the light guide plate LGP, and the optical sheet OS may be located or disposed in the accommodation part ACM.

The mold frame MF may be located or disposed on the sidewall part SW of the accommodation part ACM and an edge of the backlight unit BLU. The mold frame MF may be located or disposed on the light source LS and an edge of the optical sheet OS.

The mold frame MF may be located or disposed on the outer surfaces of the accommodation part ACM. For example, the mold frame MF may be located or disposed along the outer surfaces of the sidewall part SW. Surfaces of the sidewall part SW, which may face each other, may be defined as the inner surfaces of the sidewall part SW, and the outer surfaces of the sidewall part SW may be defined as surfaces opposite to the inner surfaces.

The mold frame MF may be located or disposed under the second polarization plate POL2 to support the display panel DP. An adhesive AD may be located or disposed between the mold frame MF and the display panel DP. The display panel DP may be adhered to the mold frames MF by means of the adhesive AD. For example, the adhesive AD may be located or disposed between the mold frame MF and the second polarization plate POL2, and the second polarization plate POL2 may be adhered to the mold frame MF.

The flexible circuit film FPC may be bent downward along the outer surface of the accommodation part ACM from the outside of the accommodation part ACM to extend downward below the accommodation part ACM. The outer surface of the accommodation part ACM may be defined as the outer surface of the sidewall part SW.

A part of the sidewall part SW, which may be adjacent to the flexible circuit film FPC, may be defined by a first sidewall part SW1. The first sidewall part SW1 may face one side surface of the light guide plate LGP. The light source LS may be located or disposed on the inner surface of the first sidewall part SW1.

The flexible circuit film FPC may be bent along the outer surface of the first sidewall part SW1 in the outside of the first sidewall part SW1. A part in which the flexible circuit film FPC may be bent may be defined as a bending part BAP. The outer surface of the first sidewall part SW1 may face the bending part BAP.

The printed circuit board PCB and the driving chip D-IC may be located or disposed under the bottom part BP of the accommodation part ACM. The printed circuit board PCB and the driving chip D-IC may be located or disposed in correspondence to a part of the flexible circuit film FPC that may be located or disposed under the bottom part BP.

The case CS may be located or disposed under the accommodation part ACM to be connected to the lower part of the accommodation part ACM. The printed circuit board PCB and the driving chip D-IC may be located or disposed between the case CS and the accommodation part ACM. For example, the printed circuit board PCB and the driving chip D-IC may be located or disposed between the bottom part BP and the case bottom part CBP.

The upper part of the shield cover SC may contact one side of the display panel DP. The shield cover SC may be located or disposed spaced apart from in a second direction DR2 from the bending part BAP or protruding or extending outwards from the bending part BAP to face the bending part BAP. The bending part BAP may face the second extension part EX2. The bending part BAP may be located or disposed between the shield cover SC and the first sidewall part SW1. The groove G may be defined in one surface of the shield cover SC that faces the bending part BAP. A part of the bending part BAP may be located or disposed in the groove G.

For example, one side of the first extension part EX1 may be located or disposed under one side of the display panel DP to contact one side of the display panel DP. The one side of the first extension part EX1 may be located or disposed under one side of the first polarization plate POL1 to contact the one side of the first polarization plate POL1. The first polarization plate POL1 may extend longer or further than the first substrate SUB1 to be adjacent to the first extension part EX1.

A part of the case sidewall part CSW, which may be adjacent to the bending part BAP of the flexible circuit film FPC, may be defined as a first case sidewall part CSW1. The first case sidewall part CSW1 may be inserted into the combination groove CG defined in the second part PT2.

The shield cover SC may be located or disposed spaced apart from in a second direction DR2 from the flexible circuit film FPC that may be connected to the one side of the display panel DP, and may cover the flexible circuit film FPC so that the flexible circuit film is not exposed to the outside. For example, since the shield cover SC contacts the display panel DP and the conductive layer CDL may be coated on the shield cover SC, the static electricity generated in the display panel DP may be discharged through the conductive layer CDL of the shield cover SC.

When the groove G is not defined in the shield cover SC, the shield cover in which the groove is not defined may have a structure in which the third extension part EX3 extends in the third direction DR3 to contact the display panel DP. The bending part BAP may contact the shield cover SC having such a structure, and push the shield cover SC to the outside.

When the shield cover SC is pushed to the outside, a part of the shield cover SC, which may contact the display panel DP, may be separated from the display panel DP. As a result, the display panel DP may be separated from the shield cover SC, and thus the static electricity generated in the display panel DP may not be discharged through the shield cover SC. For example, a part of the flexible circuit film FPC may be exposed to the outside through a space between the display panel DP and the shield cover SC, and accordingly, the flexible circuit film FPC may be viewed by a user in the outside.

However, in an embodiment, the bending part BAP may be located or disposed in the groove G defined in the shield cover SC, and thus, the bending part BAP may not contact the shield cover SC. As a result, the bending part BAP may not push the shield cover SC to the outside. Accordingly, the shield cover SC may maintain a state of contacting the display panel DP.

Consequently, the display device DD according to an embodiment may prevent the flexible circuit film FPC from being exposed to the outside by means of the shield cover SC, and may discharge the static electricity generated in the display panel DP.

According to the embodiments, the shield cover SC may be located or disposed spaced apart from in a second direction DR2 from the flexible circuit film connected to one side of the display panel, and cover the flexible circuit film so that the flexible circuit film may not be exposed to the outside.

For example, the shield cover on which the conductive material may be coated may contact a side of the display panel to discharge the static electricity generated in the display panel.

Although the embodiments have been described, it is understood that the disclosure should not be limited to these embodiments but various changes and modifications can be made by one of ordinary skill in the art within the spirit and scope of the disclosure as hereinafter claimed. Embodiments disclosed are not intended to limit the spirit and scope of the disclosure, and the scope of the disclosure should be interpreted based on the following appended claims. Accordingly, it should be appreciated that all equivalents thereto are included in the scope of the disclosure.

What is claimed is:

1. A display device comprising:
 a display panel;
 a backlight unit disposed under the display panel;
 an accommodation part that accommodates the backlight unit;
 a flexible circuit film connected to a side of the display panel, and bent along an outer surface of the accommodation part in an outside of the accommodation part to extend below the accommodation part to form a bending part of the flexible circuit film;
 a driving chip mounted on the flexible circuit film; and
 a shield cover disposed in contact with a bottom surface of the display panel, the shield cover having a groove defined in a surface facing the bending part such that the groove protrudes outward from the bending part, wherein
 the display panel comprises:
  a first substrate;
  a second substrate disposed under the first substrate;
  a first polarization plate disposed on the first substrate; and
  a second polarization plate disposed under the second substrate,
 one side of the first polarization plate extends outward than one side of the first substrate, and
 an upper portion of the shield cover extending parallel to the first polarizing plate contacts a lower surface of the one side of the first polarizing plate.

2. The display device of claim 1, wherein the shield cover comprises silicon.

3. The display device of claim 1, further comprising:
 a conductive layer coated on the shield cover.

4. The display device of claim 1, wherein the shield cover comprises:
 a first extension part extending in a second direction, the second direction crossing a first direction that is an extension direction of a side of the display panel, wherein a side of the first extension part is disposed in contact with the bottom surface of the display panel;
 a second extension part extending downward from another side of the first extension part, which is opposite to the side of the first extension part, and facing the bending part; and
 a third extension part extending in the second direction from a lower end of the second extension part and overlapping the first extension part in a plan view.

5. The display device of claim 4, wherein the side of the first extension part is disposed under the side of the display panel.

6. The display device of claim 4, wherein the groove is defined by the first, second, and third extension parts.

7. The display device of claim 6, wherein a part of the bending part is disposed in the groove.

8. The display device of claim 4, wherein
 the side of the first extension part is disposed under a side of the first polarization plate to contact the one side of the first polarization plate, and the flexible circuit film is connected to the first substrate.

9. The display device of claim 8, wherein the first polarization plate extends further than the first substrate to be more adjacent to the first extension part than the first substrate.

10. The display device of claim 8, further comprising:
 a mold frame disposed under the second polarization plate and having a frame shape; and
 an adhesive disposed between the mold frame and the second polarization plate.

11. The display device of claim 4, wherein the first and third extension parts have planes defined by the first and second directions, and extend further in the first direction than in the second direction, and
 the second extension part has a plane defined by the first direction and a third direction, and extends further in the first direction than in the third direction, the third direction vertically crossing the planes defined by the first and second directions.

12. The display device of claim 11, wherein
the shield cover further comprises a fourth extension part and a fifth extension part respectively extending downward from the third extension part, wherein the fourth and fifth extension parts face each other in the second direction, and
the fourth and fifth extension parts have planes defined by the first and third directions, and extend further in the first direction than in the third direction.

13. The display device of claim 12, further comprising:
a case disposed under the accommodation part,
wherein the case comprises:
   a case bottom part; and
   case sidewall parts extending upward from an edge of the case bottom part, wherein
      one of the case sidewall parts is inserted into a combination groove defined by the third, fourth, and fifth extension parts.

14. The display device of claim 1, wherein the accommodation part comprises:
   a bottom part; and
   sidewall parts extending upward from an edge of the bottom part to define a space to accommodate the backlight unit, together with the bottom part,
wherein the backlight unit comprises:
   a light guide plate disposed in the space; and
   a light source adjacent to a side surface of the light guide plate, and disposed in an inner surface of a first sidewall part, the inner surface of the first sidewall faces the side surface of the light guide plate.

15. The display device of claim 14, wherein
the first sidewall part includes an outer surface opposite to the inner surface of the first sidewall part, the outer surface of the first sidewall part facing the bending part, and
the driving chip is disposed under the bottom part.

16. The display device of claim 1, wherein a bottom of the groove is above the driving chip.

17. A display device comprising:
   a display panel;
   a backlight unit disposed under the display panel;
   an accommodation part that accommodates the backlight unit;
   a flexible circuit film connected to a side of the display panel, and bent along an outer surface of the accommodation part to extend below the accommodation part to form a bending part of the flexible circuit film; and
   a shield cover disposed in contact with a bottom surface of the display panel, the shield cover having a groove facing the bending part such that the groove protrudes outward from the bending part,
wherein the shield cover comprises:
a first part disposed in contact with the side of the display panel, and comprising a shape of an "L" that is rotated about 180 degrees; and
   a second part disposed in a lower part of the first part and having an arch shape, wherein
display panel comprises:
   a first substrate;
   a second substrate disposed under the first substrate;
   a first polarization disposed on the first substrate; and
   a second polarization plate disposed under the second substrate,
one side of the first polarization plate extends outward than one side of the first substrate, and
an upper portion of the first part extending parallel to the first polarizing plate contacts a lower surface of the one side of the first polarizing plate.

18. The display device of claim 17, wherein the first part comprises:
   a first extension part extending in a second direction, crossing a first direction that is an extension direction of the side of the display panel, wherein a side of the first extension part is disposed in contact with the bottom surface of the display panel; and
   a second extension part extending downward from another side of the first extension part, which is opposite to the side of the first extension part, and facing the bending part,
wherein the side of the first extension part is disposed under the side of the display panel.

19. The display device of claim 18, wherein the
side of the first extension part is disposed under a side of the first polarization plate to contact the one side of the first polarization plate, and the flexible circuit film is connected to the first substrate.

20. The display device of claim 18, wherein the second part comprises:
   a third extension part extending in the second direction from a lower end of the second extension part, and, overlapping the first extension part in a plan view; and
   a fourth extension part and a fifth extension part to respectively extend downward from both sides of the third extension part, which are opposite to each other in the second direction, and face each other,
wherein a part of the bending part is disposed in a groove defined by the first, second, and third extension parts.

21. The display device of claim 20, further comprising:
a case disposed under the accommodation part,
wherein the case comprises:
   a case bottom part; and
   case sidewall parts extending upward from an edge of the case bottom part,
wherein one of the case sidewall parts is inserted into a combination groove between the fourth and fifth extension parts.

* * * * *